W. MEYNER.
SCREW.
APPLICATION FILED OCT. 16, 1917.
1,274,923.
Patented Aug. 6, 1918.
2 SHEETS—SHEET 2.
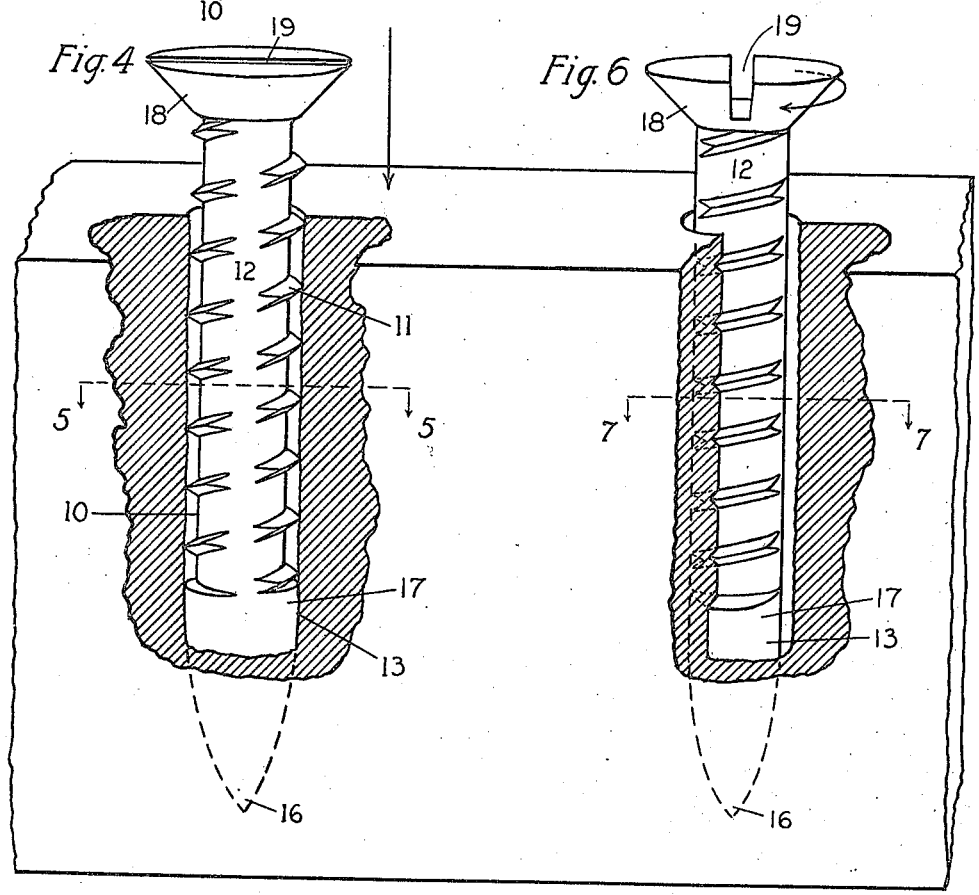
Walter Meyner, Inventor

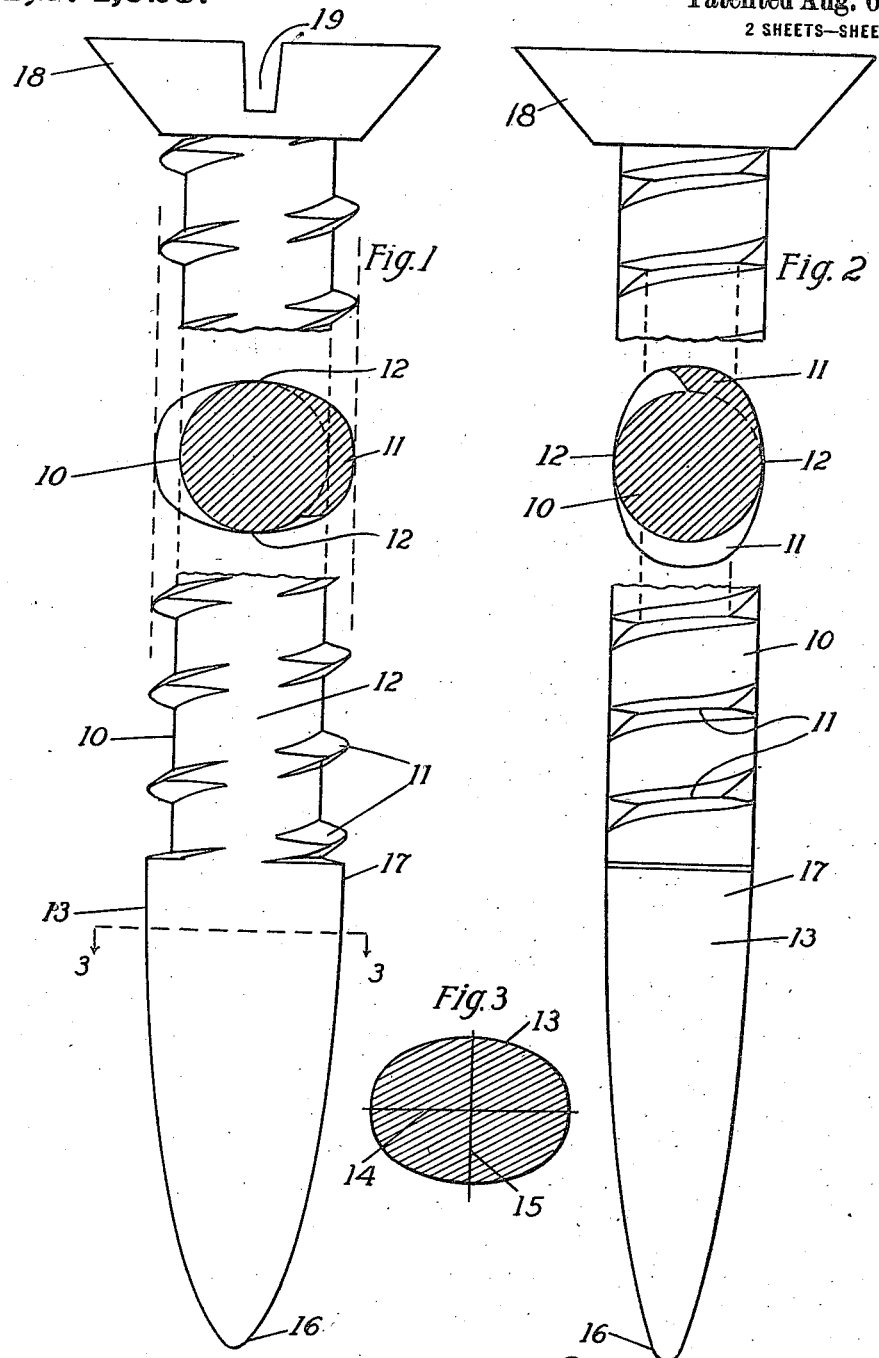

UNITED STATES PATENT OFFICE.

WALTER MEYNER, OF NEW YORK, N. Y.

SCREW.

1,274,923.  Specification of Letters Patent.  Patented Aug. 6, 1918.

Application filed October 16, 1917. Serial No. 196,872.

*To all whom it may concern:*

Be it known that I, WALTER MEYNER, a citizen of the United States, residing at 150 Nassau street, New York city, New York, have invented new and useful Improvements in Screws, of which the following is a specification.

My present invention has for its object the provision of a single form of fastening which may be quickly driven after the manner of a nail and then turned like a screw to lock it in place.

The accompanying drawings illustrate a practical embodiment of the invention, wherein:—

Figures 1 and 2 are side and edge views of the screw, broken away at the center to show the cross-sectional shapes.

Fig. 3 is a cross-sectional view on line 3—3 of Fig. 1.

Fig. 4 is a view of the screw as first driven into a block of wood.

Fig. 5 is a cross-sectional view taken substantially on the plane of line 5—5 of Fig. 4.

Fig. 6 is a view of the screw as turned to lock it in place.

Fig. 7 is a sectional view taken substantially on the plane of line 7—7 of Fig. 6.

The main shank or body 10 of the screw is substantially circular in cross-section and projecting from two opposite sides of this shank are the segmental screw flanges 11. This leaves the remaining two opposite sides of the shank substantially plain and free of obstructions, as indicated at 12 so as not to interfere with the driving of the screw.

To prevent the outstanding screw flanges from obstructing the driving and being injured in such driving operation, they are protected by a guard or shield 13 having a major or maximum diameter 14, in the plane of the axis of the screw flanges and equal to the diameter of such screw flanges and a minor axis 15 equal to the diameter of the circular shank and disposed on the axis of the plain smooth sides 12 of the shank. This guard tapers down to a relatively sharp driving point 16.

To insure the screw driving straight and true, there is provided a bearing 17, extending rearwardly from the guard and forming in effect a continuation thereof. This bearing is of sufficient longitudinal extent to hold the screw to its true course and to force back the fibers of the wood or other material in which the screw is being driven, sufficiently to prevent them springing back after the guard has passed and so interfering with the passage of the screw flanges. This elongated bearing portion in effect gives the fibers a "set" such as to prevent them obstructing the subsequent passage of the screw flanged portions of the screw.

The shank is provided with a suitable head by which it may be driven and then be turned to cause the screw flanges to "bite" into the solid material at the minor axis of the bore, the same being here shown as a screw head 18 having a screw driven slot 19. This slot is widened at the top, as indicated, so as to prevent closing of the slot in hammering the screw in place.

In use, the screw is simply driven as far as need be, with a hammer, like an ordinary nail and is then turned with a screw driver or other instrument, to lock it in its seat. By reason of the guard and bearing portions, the screw drives easily and surely without more apparent effort than an ordinary nail and when driven home may be secured by simply giving it a quarter-turn.

What I claim, is:—

A fastening comprising a shank substantially circular in cross section having two opposite sides substantially plain and free of projections, projecting flanges on the remaining two opposite sides of the shank, a sharpened driving point on the entering end of the shank, a relatively smooth transversely, convexly, curved, driving guard and shield extending rearwardly from the point and enlarged on the axis of the flanges to substantially elliptical form in cross section with a diameter substantially equal to such flanged portion of the shank to thereby protect the flanges and form a bore to receive said flanges as the fastening is driven, said shield being extended longitudinally a distance to form a bearing long enough to insure straight driving of the fastening and setting of the fibers of the material in which the fastening is driven and a head on the opposite end of the shank for driving the same and for turning it to carry the flanges into solid material.

In testimony whereof I, WALTER MEYNER, have signed my name to this specification in the presence of the subscribing witnesses, this tenth day of October, 1917.

WALTER MEYNER.

Witnesses:
MARION HAYS,
E. MEYNER,
LOUIS PASTORINI.